United States Patent [19]
Davis et al.

[11] Patent Number: 5,825,996
[45] Date of Patent: Oct. 20, 1998

[54] PRINT-TO-EDGE DESKTOP PRINTING

[75] Inventors: William N. Davis; Ira Mirochnick, both of Northbrook, Ill.

[73] Assignee: Monotype Typography, Inc., Elk Grove Village, Ill.

[21] Appl. No.: 744,884

[22] Filed: Nov. 8, 1996

[51] Int. Cl.$^6$ .................................................. G06K 15/00
[52] U.S. Cl. .......................................... 395/117; 395/111
[58] Field of Search .................................... 395/101, 105, 395/111, 117, 115; 347/2, 4; 346/134

[56] References Cited

U.S. PATENT DOCUMENTS

| | | | |
|---|---|---|---|
| 4,873,643 | 10/1989 | Powell et al. | 364/468 |
| 5,036,472 | 7/1991 | Buckley et al. | 364/479 |
| 5,428,423 | 6/1995 | Clark | 355/77 |
| 5,513,117 | 4/1996 | Small | 364/479 |
| 5,530,793 | 6/1996 | Watkins et al. | 395/117 |
| 5,546,316 | 8/1996 | Buckley et al. | 347/110 |

OTHER PUBLICATIONS

Exhibit A—Monotype® brochure entitled "Discover a great new way to make personalized greeting cards and certificates!" (Monotype Typography Inc.).

Exhibit B1—Catalog entitled "Paper Catalog," see for example pp. 31, 32, 35, 53, 54, 15A, 55–58, 61 and 69. (PaperDirect, Inc.).

Exhibit B2—Samples of preprinted stock (preprinted on one side) (items BC1355, BC0505, BC1065). (PaperDirect, Inc.).

Exhibit B3—Samples of preprinted stock (preprinted on both sides). (Paper Direct, Inc.).

Exhibit C1—three publications entitled "Door Hangers, "AdjustaEasels™ & Slot Tents™ and Panel Cards & Postcards, respectively. (Laserblanks™).

Exhibit C2—Publication entitled "Running Guide/Jumbo Door Hanger" and sample blank stock. (LaserBlanks™).

Exhibit D1—Catalog entitled "Laser & Ink Jet Products," see, for example, pp. 14, 15, 17 and back cover of catalog. (Avery Dennison Corporation).

Exhibit D2—Laser card products information sheets with sample blank stock of product #5389. (Avery Dennison Corporation).

Exhibit D3—Publication entitled "Ink Jet Greeting Cards." (Avery Dennison Corporation).

Exhibit D4—Publication entitled "Laser Post Cards." (Avery Dennison Corporation).

Exhibit H—Publication entitled "Micrografx and Hallmark Cards, Inc. Announce Creative Greeting Card Software on CD–ROM"and Hallmark Connections Card Studio ™. (Micrografx and Hallmark Cards, Inc.)

Exhibit D5—Publication entitled "Ink Jet Business Cards." (Avery Dennison Corporation).

Exhibit E—Publication entitled "American Greetings CreataCard® Plus!™" (Micrografx and American Greetings).

Exhibit F—Publication entitled "Hallmark Connections/Microsoft® Greeting Workshop." (Microsoft and Hallmark Connections).

Exhibit G—Publication entitled "Introducing INF!NITE designs™." (InScribe, Inc.).

*Primary Examiner*—Arthur G. Evans
*Attorney, Agent, or Firm*—McAfee & Taft

[57] ABSTRACT

An improved personal computer system, method, printed card manufacturing kit, memory device, apparatus and print medium are all directed to providing a finished printed product that has printing completely to one or more edges of the product through the use of a conventional desktop printer.

24 Claims, 16 Drawing Sheets

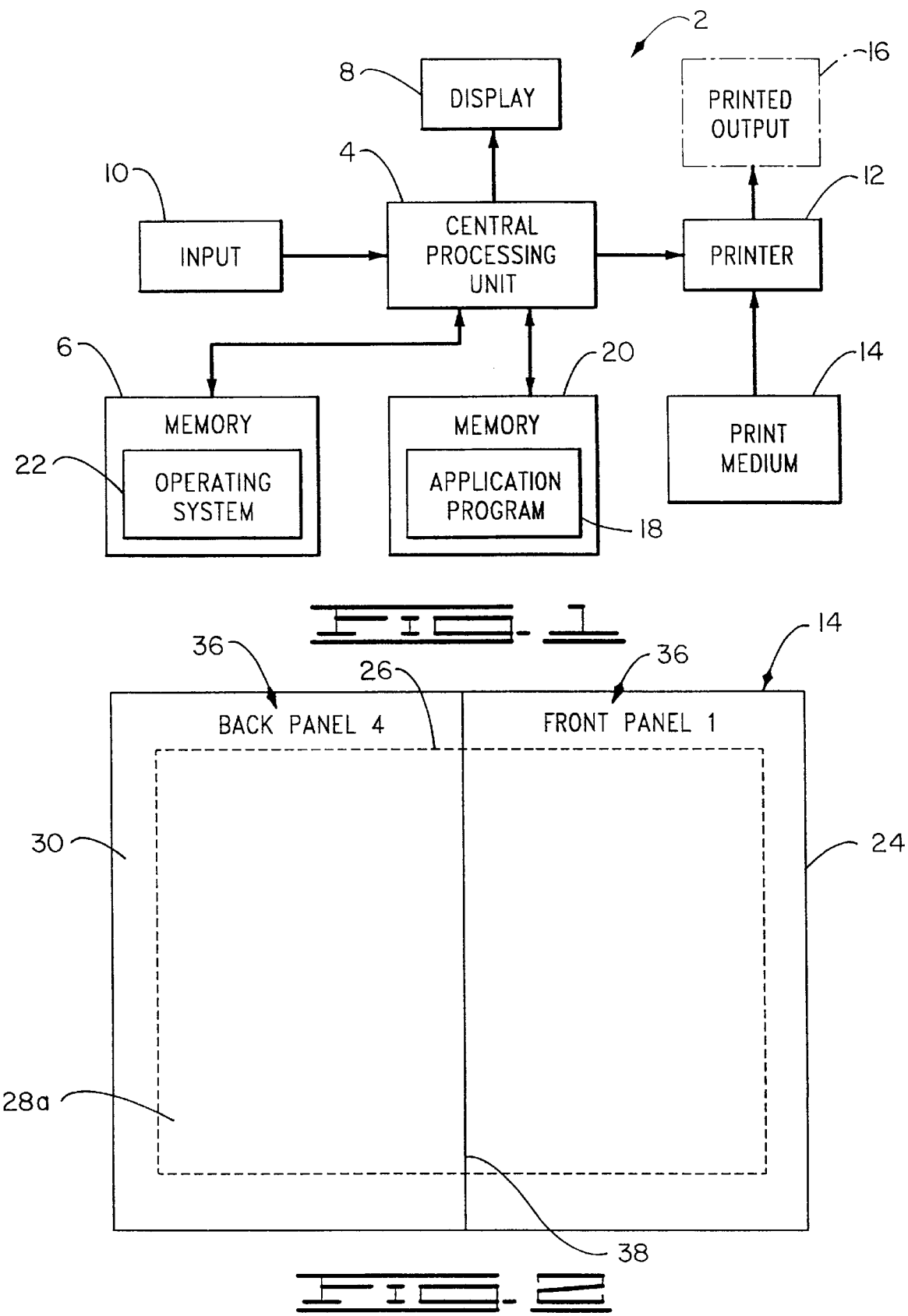

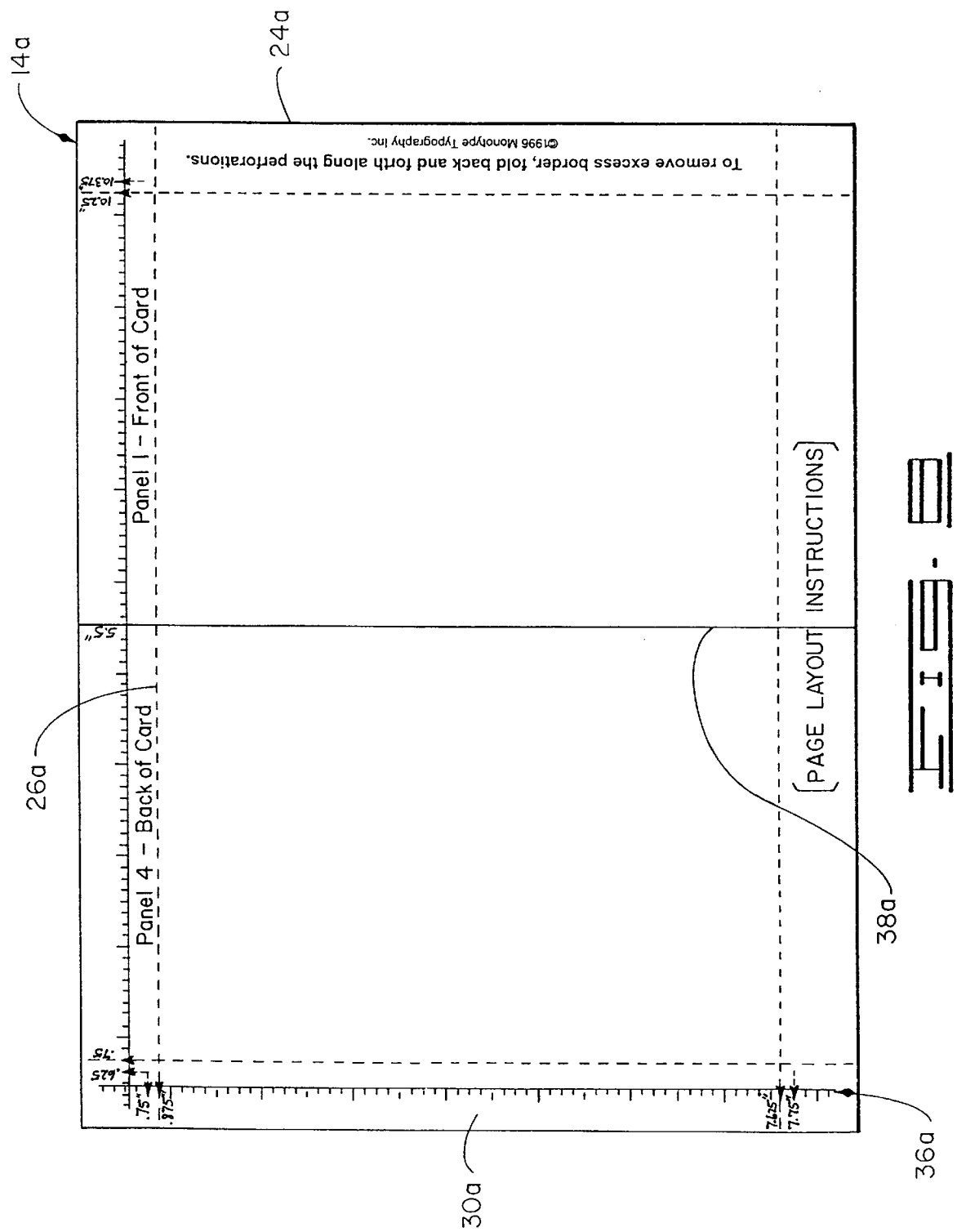

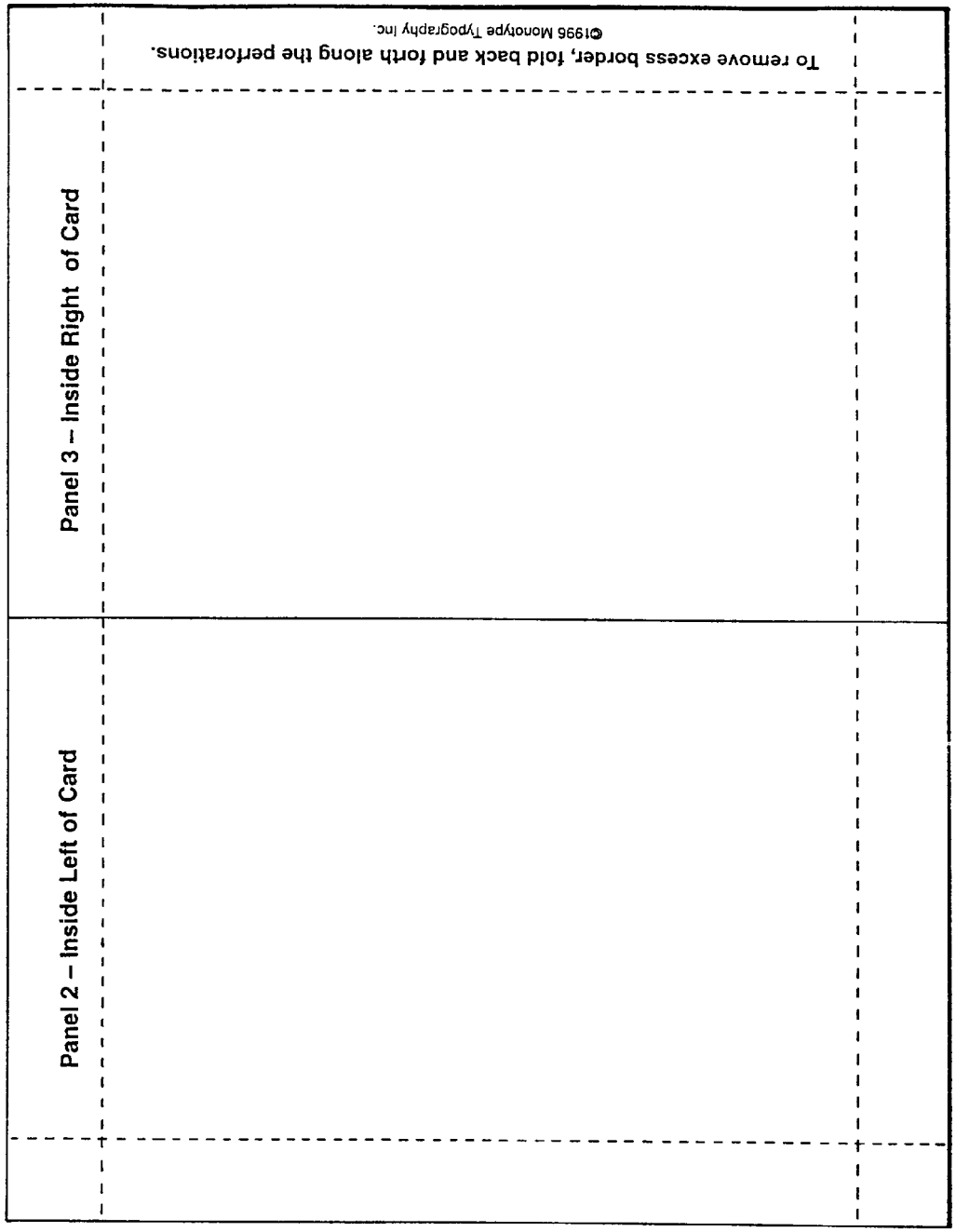

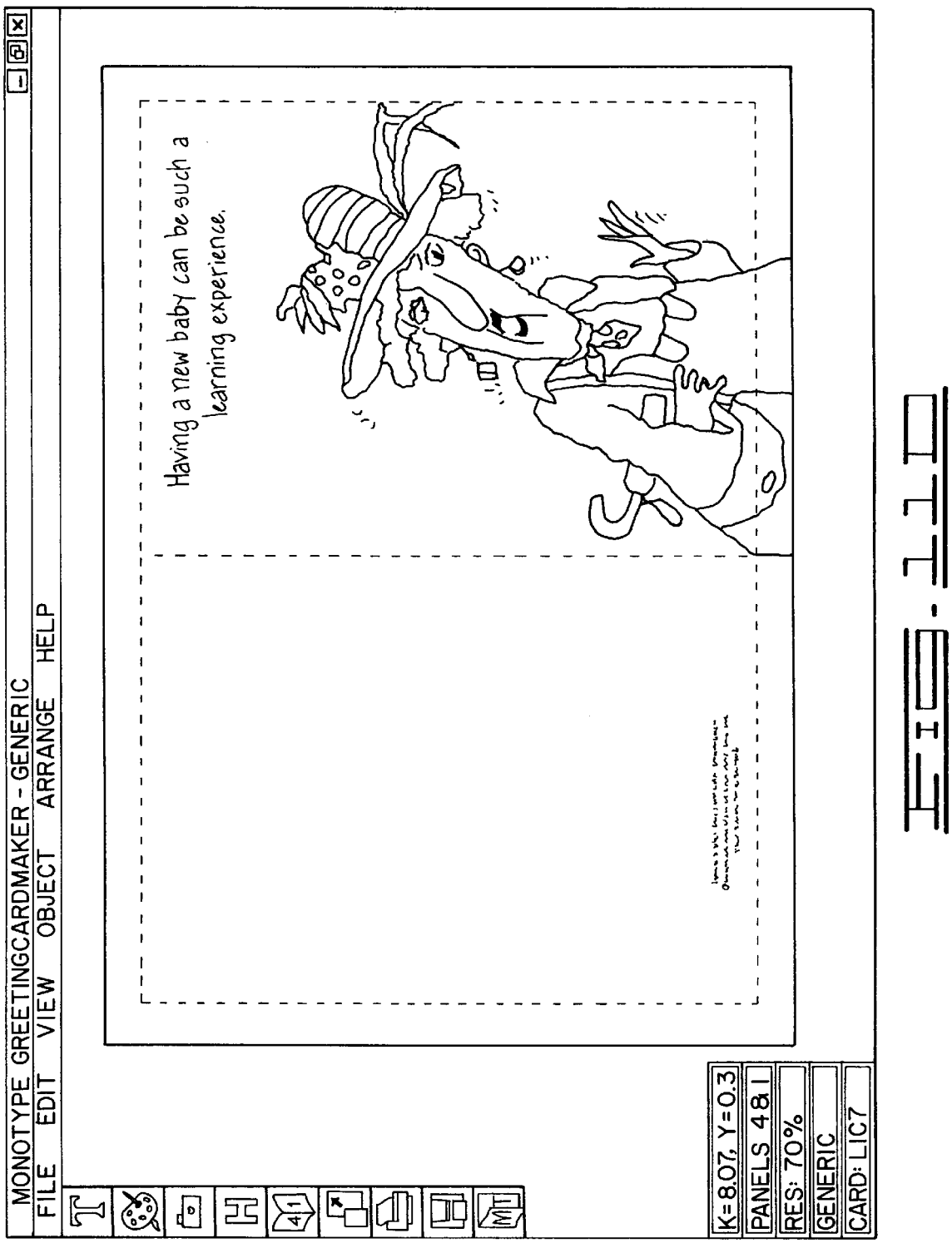

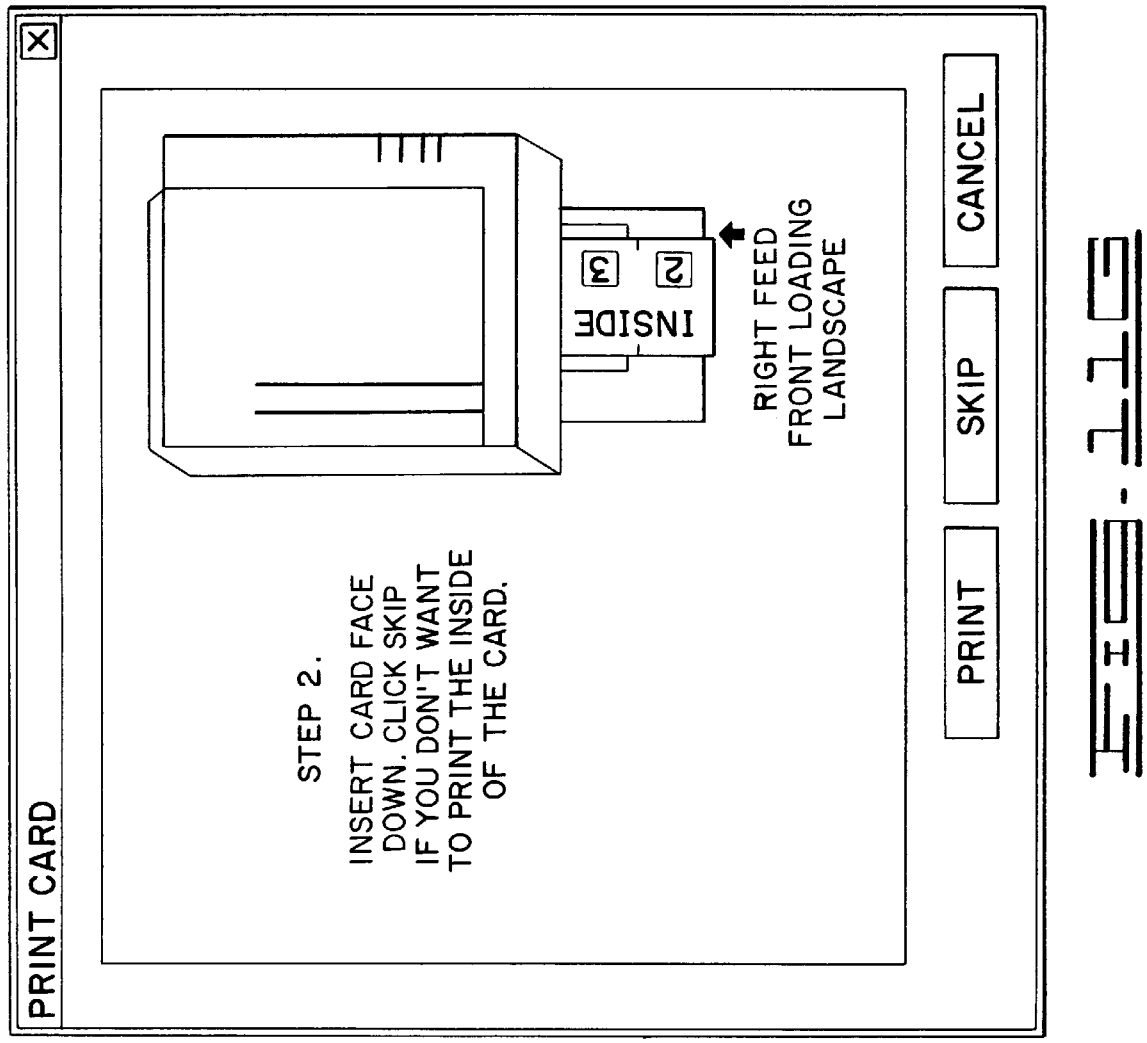

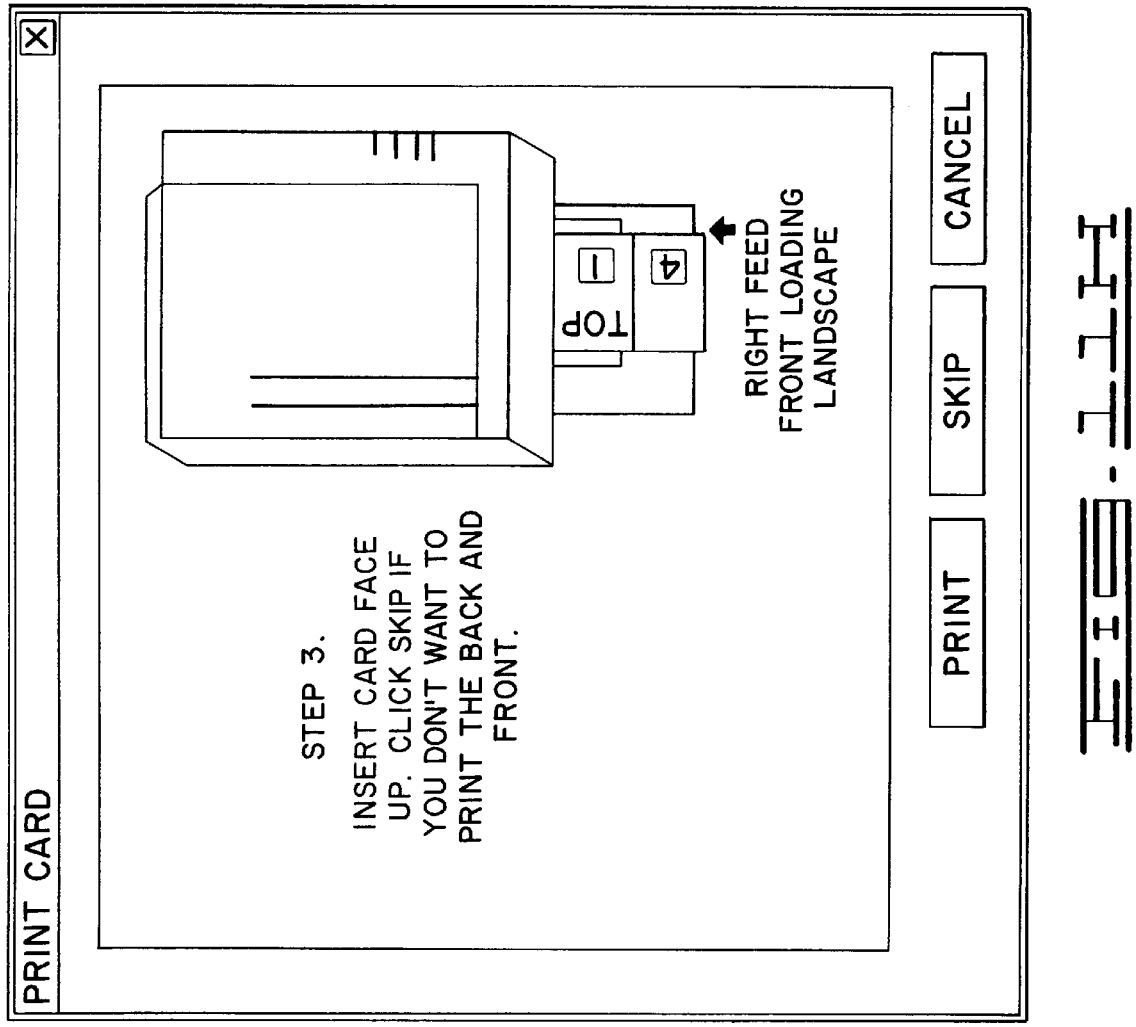

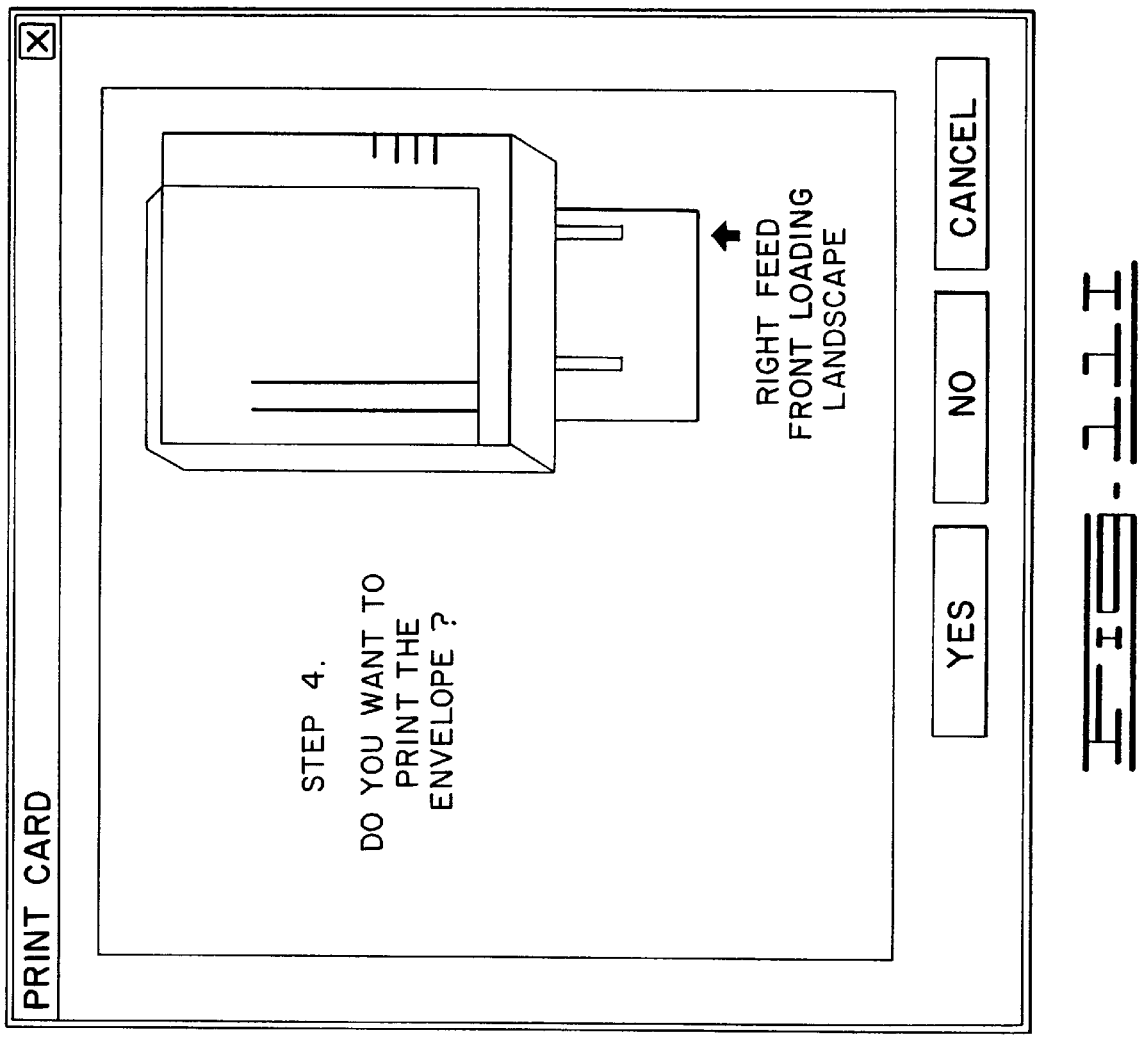

PRINT-TO-EDGE DESKTOP PRINTING

BACKGROUND OF THE INVENTION

This invention relates generally to providing, through a personal computer system having a conventional desktop printer, a finished printed product that has printing completely to one or more edges of the product. This is applicable to making greeting cards, invitations, announcements and other personalized products, for example, such that they have the look of products made using traditional offset lithography.

Conventional personal computer systems are versatile; however, they have one shortcoming of particular relevance to the present invention, namely, conventional personal computer systems having conventional desktop printers cannot print completely to the edge of the medium run through the printer. That is, desktop printers, particularly ink jet and laser printers and the like, are incapable of printing from edge-to-edge of a sheet of paper. These printers typically require a quarter inch or more of unprinted edge to grip the paper and to protect the internal mechanisms of the printer from damage resulting from over application of ink or toner. This limitation also typically occurs in printing equipment used by professional printing companies; however, such printing companies have extensive equipment to accurately trim the paper after it has been printed and dried. Such professional printing companies have for many years used a process with "trim marks" and "bleeds." In such a process, a sheet of paper larger than the final image is used to lay out and print on. The trim marks appear outside the image area to identify how the paper is to be cut at the completion of the printing process. By printing beyond the trim marks, a bleed occurs. That is, when the final trimming occurs, a cut is made through an area which has been printed. As a result, the final product contains a printed image which extends all the way to the edge of the final product.

Using a conventional desktop printer of a personal computer system to attempt to achieve the finished look comparable to that of a professional printing company, the user would need to use scissors or some other manual cutting device or would need to take the printed paper to a printing company for trimming on the printing company's equipment. Uniformity and accuracy or time and expense would suffer as a result of one of these. Also, when folding the finished product in half if a folded card were to be made, the lack of a pre-applied "score" could cause the fold to be crooked. Such self-help attempts would likely not produce a finished product of the desired quality.

The foregoing shortcomings are important, at least where high quality work is desired, which is typically the case when one wants to make greeting cards, invitations, announcements and other personalized products. Despite these shortcomings, there are products on the market to allow these items to be developed using a conventional personal computer system.

Micrographx/Hallmark Connections "Card Studio" and Paper Direct "Instant Greetings" are two such software products. These use paper styles that are either standard U.S. letter size or pre-cut to greeting card size, but they do not have a design preprinted. These software products allow the user to select a background image and a verse to create a greeting card or other products. The final output is printed by a laser jet, ink jet, bubble jet, or other kind of printer customarily used in association with a personal computer. These products result, however, in a finished product which either must be manually or professionally cut as suggested above or left with a white border around the product at least equivalent to the "dead zone" that desktop printers cannot print into as referred to above. These shortcomings even exist in two recently released products: Micrographx/American Greeting "CreataCard®Plus!™" and Hallmark Connections/Microsoft "GreetingsWorkshop."

From the foregoing, there is the need to enable a user of a desktop printer in a personal computer system to print documents which have the appearance of being professionally produced in that the final product has its printed image extended to one or more edges of the product and with all copies of the final product uniform in size and consistent in quality and accuracy. When this is enabled, this should also allow for such printing to occur on either or both sides of a two-sided print medium, such as a sheet of paper. This, however, creates the further need for a way to enable the user to correctly reposition the sheet of paper, or other print medium, since printing on two sides with a conventional desktop printer will require the sheet of paper to be oriented in a first manner and run through the printer and then reoriented in different manner and run a second time through the printer for printing on the other side. If this latter need is not met, the user may enter the paper incorrectly into the printer and thus print upside down on one side relative to the other side.

SUMMARY OF THE INVENTION

The present invention overcomes the above-noted and other shortcomings of the prior art, and meets the foregoing needs, by providing a novel and improved personal computer system, method, printed card manufacturing kit, memory device, apparatus and print medium all directed to easily, quickly and economically providing a high quality finished printed product that has printing completely to one or more edges of the product achieved through a conventional desktop printer.

The personal computer system of the present invention includes a central processing unit, a memory connected to the central processing unit, an operating system program stored in the memory, a display responsive to control by the central processing unit, input means for providing input to the personal computer system, and a printer responsive to control by the central processing unit. The present invention provides the following improvement to such a personal computer system. This improvement comprises a two-sided substrate loaded in the printer and having an outer periphery and a continuous perforated line spaced inwardly of the outer periphery such that the perforated line defines corresponding primary printable areas on both sides of the substrate inwardly of the perforated line and such that the perforated line defines corresponding secondary printable areas on both sides of the substrate outwardly of the perforated line. The improvement further comprises an application program loaded in the memory. The application program is compatible with the operating system program, and it includes means, responsive to input from the input means, for providing an output having a first portion to be printed on one side of the substrate in the primary printable area thereof and having a second portion to be printed on the other side of the substrate in the primary printable area thereof. The application program further includes means, responsive to input from the input means, for actuating the printer at a first time (a) to print one of (1) the first portion of the output on the one side of the substrate such that part of the first portion is printed continuously across at least part of the perforated line and in the secondary printable area of the one side and the remainder of the first portion is printed within the primary printable area of the one side and (2) the second portion of the output within at least the primary printable area of the other side of the substrate, and (b) to output the substrate from the printer. The application program still further includes means, responsive to input from the input means, for actuating the printer at a second time to print the other of (1) the first portion of the output on the one side of the substrate such that part of the first portion is printed continuously across at least part of the perforated line and in the secondary printable area of the one side and the remainder of the first portion is printed within the primary printable area of the one side and (2) the second portion of the output within at least the primary printable area of the other side of the substrate, after the substrate has been output from the printer and reloaded in changed orientation in the printer.

The method of the present invention is one for making a finished printed output having graphical content printed to an edge of the finished printed output. The method comprises loading a two-sided print medium into a printer connected in a personal computer system. The print medium is loaded so that a first side of the print medium is in a print position, and the print medium has a perforated line defining outwardly therefrom a continuous outer margin along the entire periphery of the print medium and defining inwardly therefrom primary printable areas on both sides of the print medium. The method also comprises printing, with the printer in the personal computer system, a graphical image on the first side of the print medium such that at least a portion of the graphical image is printed continuously across the perforated line into both the outer margin and the primary printable area of the first side of the print medium. The method further comprises removing the print medium from the printer and removing the outer margin along the perforated line so that the remaining portion of the print medium becomes the finished printed output having at least a portion of the graphical image extending completely to an edge of the finished printed output.

The present invention also provides a printed card manufacturing kit capable of being installed in a personal computer system which includes an operating system program and a printer. The kit comprises the combination of a plurality of two-sided substrates and an encoded portable memory device adapted to be connected with the personal computer system and further defined as follows. Each of the substrates is adapted to be loaded in the printer of the personal computer system, and each of the substrates has an outer periphery and a continuous perforated line spaced inwardly of the outer periphery such that the perforated line defines corresponding primary printable areas on both sides of the substrate inwardly of the perforated line and such that the perforated line defines corresponding secondary printable areas on both sides of the substrate outwardly of the perforated line. The encoded portable memory device includes means, adapted to communicate with the operating system program of the personal computer system to receive control information from user input into the personal computer system, for actuating the printer to print a graphical image on a selected one of the substrates loaded in the printer such that at least part of the graphical image is printed continuously across at least part of the perforated line into both the primary and secondary printable areas on a side of the selected one of the substrates.

The memory device of the present invention is adapted to be connected with a personal computer system which includes an operating system program and a printer. The memory device comprises a memory substrate; a portable housing having the memory substrate disposed therein, which housing is adapted to releasably connect to the personal computer system; and apparatus for printing a graphical image through the personal computer system. This apparatus includes means, encoded on the memory substrate and adapted to communicate with the operating system program of the personal computer system to receive control information from user input into the personal computer system, for creating with the personal computer system a graphical image to be printed onto a printable area of a print medium loaded in the printer, wherein the graphical image has an outer edge and wherein the printable area includes a perforated line. The apparatus still further includes means, encoded on the memory substrate and adapted to communicate with the operating system program of the personal computer system to receive control information from user input into the personal computer system, for actuating the printer to print the graphical image on the print medium such that at least part of the outer edge of the graphical image is printed continuously across at least part of the perforated line of the printable area of the print medium.

The present invention also includes the aforementioned apparatus as distinct from the memory device as a whole.

The present invention also provides a print medium for use in a personal computer system which includes a printer. The print medium is used to produce a printed output having at least a portion of a graphical image printed completely to an edge of the printed output. This print medium comprises a two-sided substrate to load in the printer of the personal computer system. The substrate has an outer periphery and a continuous perforated line. The perforated line is spaced inwardly of the outer periphery such that the perforated line defines a primary printable area on a side of the substrate inwardly of the perforated line and further such that the perforated line defines a marginal area having a secondary printable area on this same side of the substrate outwardly of the perforated line. The primary and secondary printable areas are located within the substrate to receive printing of the graphical image from the printer such that at least a portion of the graphical image is printed across the perforated line into at least part of both the primary and secondary printable areas. The print medium preferably further comprises instructional indicia disposed on the marginal area. The substrate preferably further has a score line defined across at least the primary printable area so that the portion of the substrate remaining after tearing along the perforated line and removing the marginal area is folded along the score line to provide a folded card having at least a portion of the graphical image printed completely to a non-folded edge of the card.

Accordingly, an advantage of the present invention is that it provides, through the use of a personal computer system having a conventional desktop printer, a finished product that has printing completely to one or more of its edges. Another advantage is that it facilitates multiple printing runs to be performed on a single print medium such that printed images during the various runs are properly oriented in the finished product. Other advantages include ease, speed and economy of use and quality of the finished product.

Therefore, from the foregoing, it is a general object of the present invention to provide a novel and improved personal computer system, method, printed card manufacturing kit, memory device, apparatus and print medium all directed to providing a finished printed product that has printing completely to one or more edges of the product achieved through a conventional desktop printer. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram of an improved personal computer system of the present invention.

FIG. 2 is a view of one side of a sheet of a preferred embodiment of a print medium of the present invention.

FIG. 8 is a view of one side of another embodiment of the print medium.

FIG. 9 is a view of the other side of the print medium shown in FIG. 8.

FIGS. 11A–11I are representations of preferred embodiments of visual screens output through a display of the personal computer system in implementing the means of FIG. 10.

DETAILED DESCRIPTION OF PREFERRED EMBODIMENTS

Figures 3, 4:
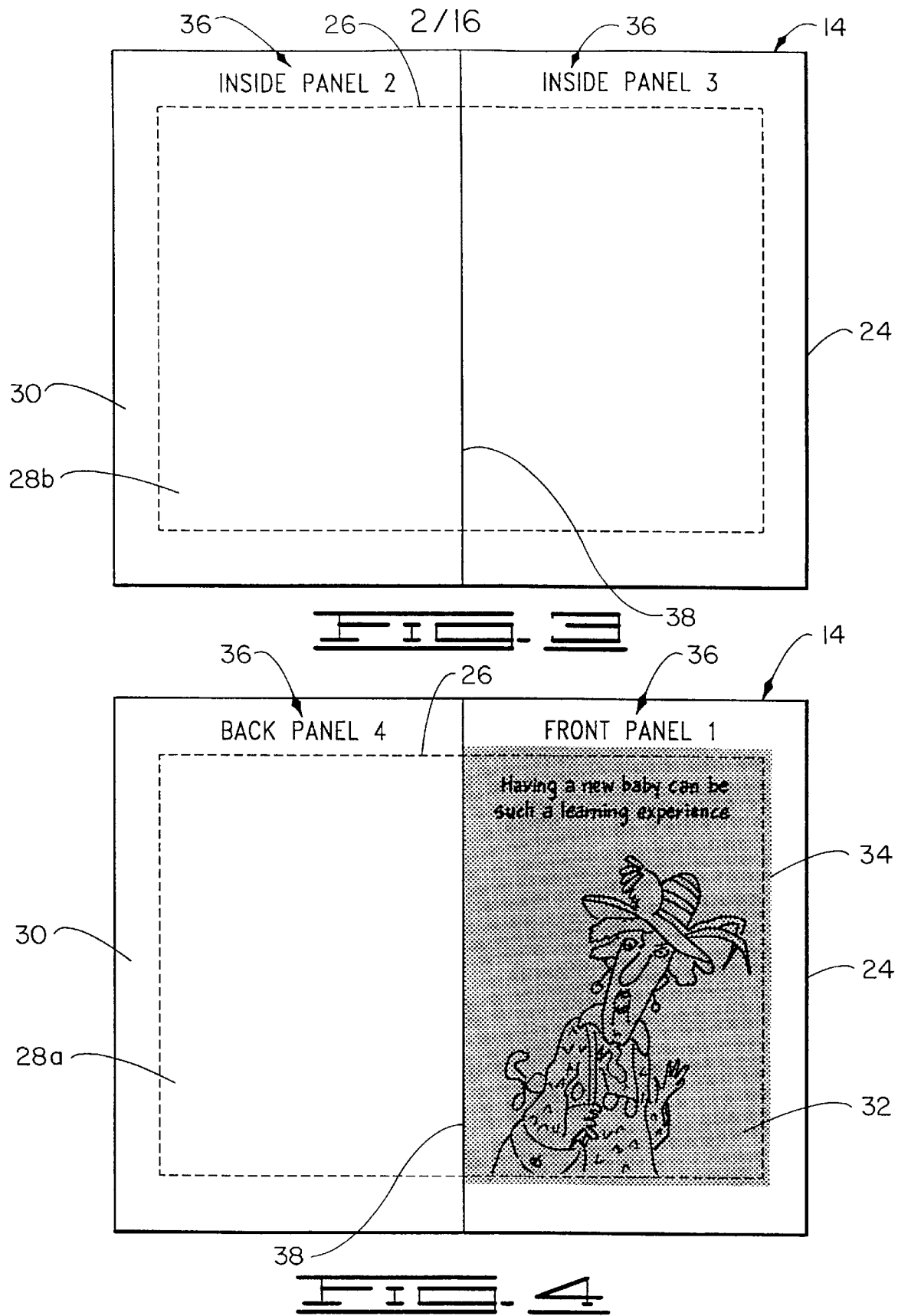
FIG. 3 is a view of the other side of the print medium shown in FIG. 2.
FIG. 4 is the same view as shown in FIG. 2, but showing a graphical image printed on the print medium.
Figure 5:
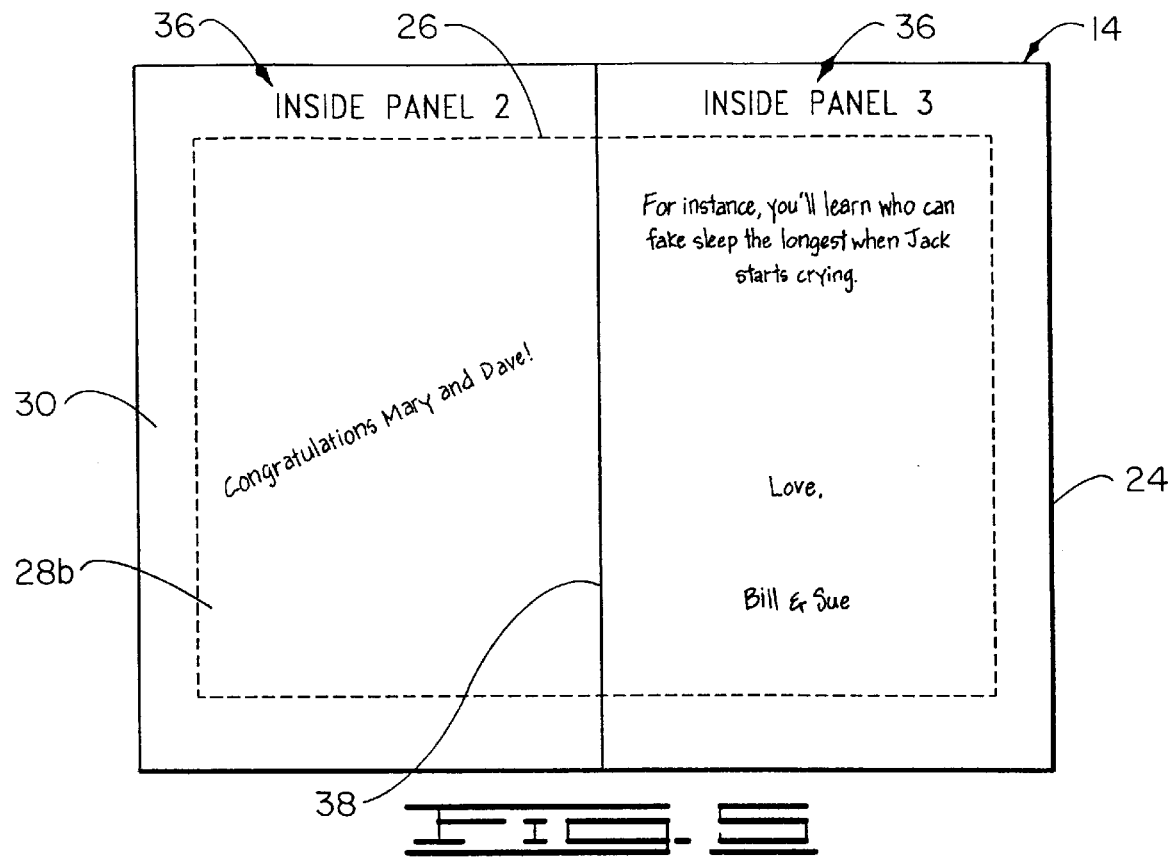
FIG. 5 is the same view as shown in FIG. 3, but showing printed images on the other side of the print medium.

Referring to FIG. 1, a personal computer system 2 incorporating the present invention is shown. The personal computer system 2 includes a central processing unit 4 and a memory 6 connected to the central processing unit 4. The central processing unit 4 and the memory 6 are of conventional types known in the art as parts of a conventional personal computer system. Non-limiting examples include those devices used in the following personal computer systems COMPAQ PRESARIO, PACKARD BELL, IBM ACHIEVA, IBM THINKPAD, NEC VERSA, and GATEWAY 2000. The memory 6 typically includes both read only memory and random access memory. The memory 6 can be in one or more forms, such as integrated circuit, hard drive, diskette or compact disc.

The personal computer system 2 also includes a display 8 that responds to control by the central processing unit 4 and which is of a conventional type (e.g., cathode ray tube, liquid crystal display, etc.). Specific non-limiting examples include any type of display suitable for use with any of the aforementioned specific examples of personal computer systems.

Another conventional element of the personal computer system 2 is input means 10 for providing input to the personal computer system 2. Non-limiting examples of the input means 10 include a keyboard and/or mouse.

A further conventional component of the personal computer system 2 is a printer 12 which responds to control by the central processing unit. The printer 12 is particularly a desktop printer and preferably one of the following types: ink jet, laser, bubble jet, solid ink, and thermal ink. Non-limiting specific examples of printer models include LEXMARK COLOR JETPRINTER 2050, HEWLETT-PACKARD LASERJET 5, and CANON BJ210.

An improvement to the aforementioned computer system 2 provided by the present invention includes a print medium 14 to be loaded into the printer 12 for printing therethrough to provide a printed output 16. Details of the print medium 14 will be described below.

Another improvement added by the present invention to the personal computer system 2 is an application program 18. The program 18 can be loaded or made accessible via a memory device 20 of the present invention described below. Alternatively, the application program 18 can be loaded in the main memory 6 or it can be provided as apparatus made available by whatever suitable means (e.g., by interactive communication or download from another source, such as the Internet or other connected network or device). In any event, the application program 18 is compatible with an operating system 22 loaded in the memory 6. Non-limiting examples of such an operating system 22 include an operating system used in Apple computers or an operating system used in IBM-compatible personal computers (e.g., Microsoft DOS, with or without Microsoft Windows or other environment; Microsoft Windows 95; or Microsoft Windows NT). UNIX is another non-limiting example. In whatever operating system-compatible form the application program 18 takes, the program includes means used in determining what to print with regard to the present invention. The program 18 can also include means used for sizing and positioning what is to be printed. The program 18 further includes means used in actuating the printer in an appropriate sequence to effect the printing onto the print medium 14 to produce the printed output 16. These means of which the application program 18 is comprised and the memory device 20 will be further described below.

Print Medium 14

Referring to FIGS. 2–9, the preferred embodiment print medium 14 of the present invention comprises a two-sided substrate 24 that can be loaded in the printer 12 of the personal computer system 2. The substrate 24 has an outer periphery or edge of rectangular shape in the pictured embodiment; however, the substrate 24 in general can have any suitable configuration.

Spaced inwardly of the outer periphery is a continuous, closed perforated line 26. The line 26 is located on the substrate 24 such that it defines or circumscribes a primary printable area 28 on one or both sides of the substrate 24 (area 28a for the side of FIG. 2 and area 28b for the side of FIG. 2). The area(s) 28 is (are) located inwardly of the perforated line 26. The perforated line 26 can be disposed to give the outer boundary of the primary printable area any desired shape. It gives a rectangular shape as shown in the drawings; however, other shapes can be defined.

The perforated line 26 is also located such that it defines a marginal area 30 completely around the substrate 24 outwardly of the perforated line 26. The marginal area 30 is wide enough along each side of the substrate 24 so that it includes both (1) the "dead zone", which is the nonprintable edge region defined by the particular printer 12, and (2) a secondary printable area between the "dead zone" and the adjacent perforated line 26.

The primary and secondary printable areas of the substrate 24 are located within the substrate 24 to receive printing of the graphical image provided from the personal computer system 2 under control of the application program 18 and through the printer 12. More specifically, these areas are defined such that at least a portion of the graphical images is printed across at least a part of the perforated line 26 into at least part of both the primary and secondary printable areas. See, for example, FIG. 4 wherein a graphical image 32 is shown printed with an edge 34 thereof continuously printed across a portion of the perforated line 26.

FIGS. 2–5 also show that the print medium 14 further comprises instructional indicia 36 disposed on the marginal area 30. This instructional indicia 36 is particularly shown, but is not limited to, alphanumeric instructions which are easily discerned by a user of the present invention. For example, in FIG. 2 the indicia 36 identify a "front panel" and a "back panel" also respectively numerically designated by the numerals "1" and "4." The indicia 36 shown in FIG. 3 identify two "inside panels" respectively numbered "2" and "3." These particular indicia 36 show which panel is which, but other types of instructional indicia can be used (e.g., specific instructions on how to load the print medium 14 into the printer 12 and information referencing these instructions displayed on the application program during printing).

Figure 6:
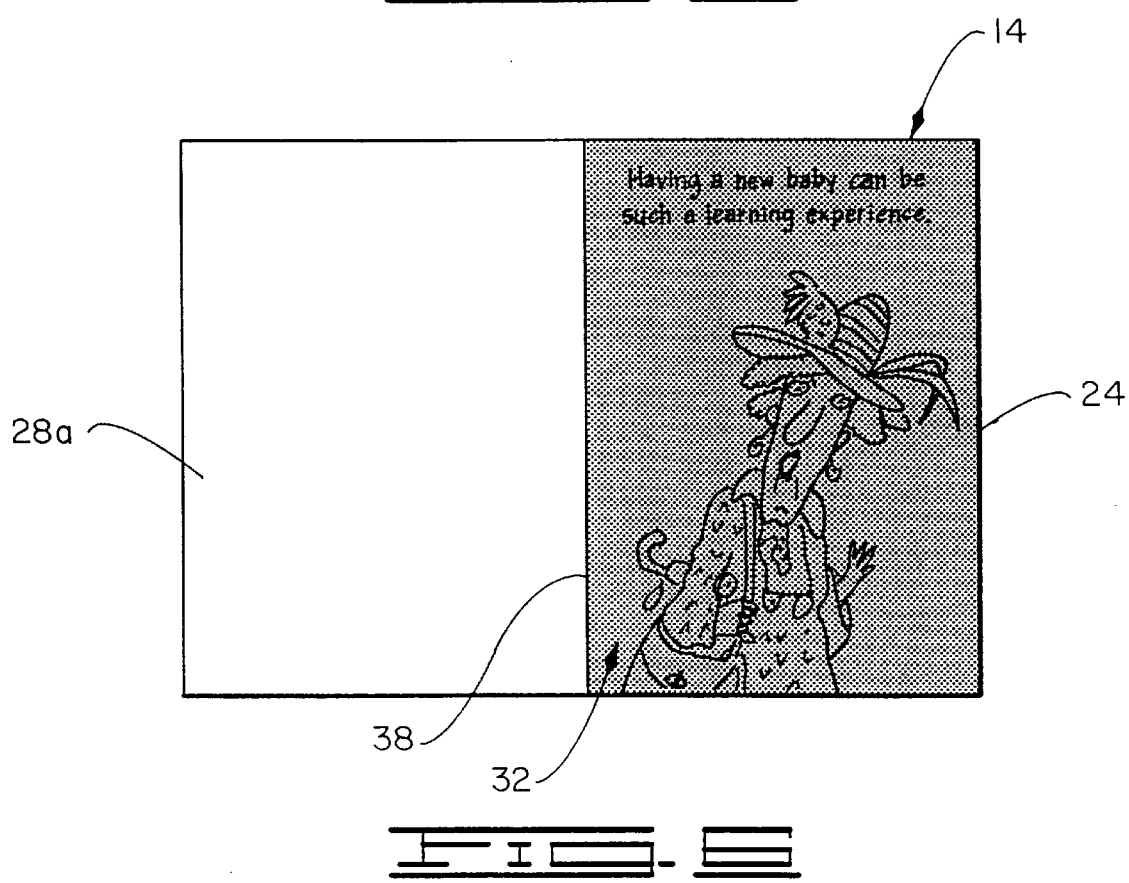
FIG. 6 is the same view as shown in FIG. 4, but with an outer marginal area removed from the print medium.
Figure 7:
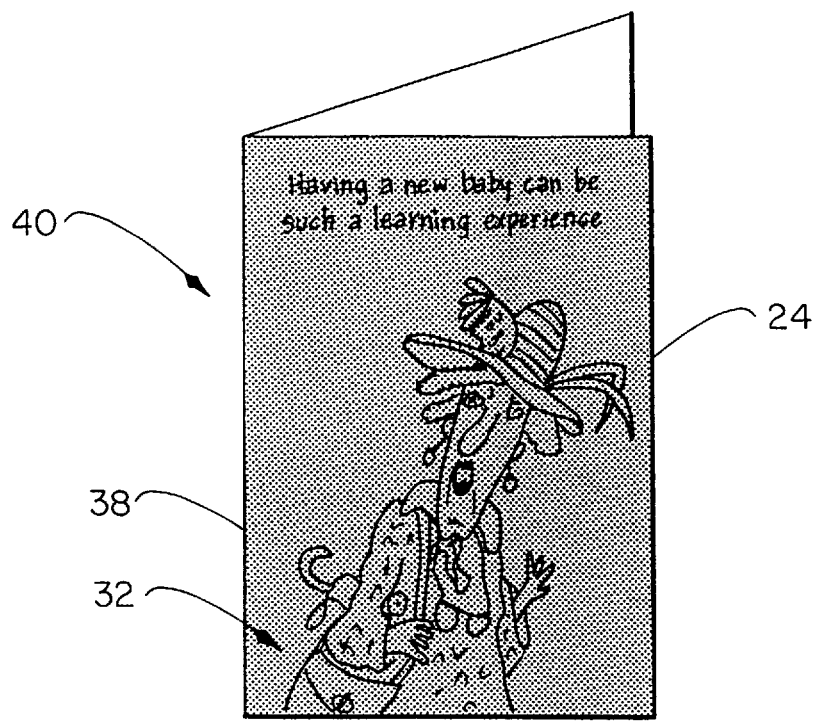
FIG. 7 shows the product of FIG. 6 folded along the illustrated score line to provide a folded card.

The substrate 24 further has a score line 38 defined across at least the primary printable area(s) 28 so that the portion of the substrate 24 remaining after the marginal area 30 is torn away along the perforated line 26 and removed therefrom can be folded along the score line 38 to provide a folded card having at least a portion of the graphical image printed completely to a non-folded edge of the card. Such a folded card is shown in FIG. 7 which results from folding the remainder of the substrate 24 shown in FIG. 6 after the marginal region 30 has been removed. The score line 38 is preferably formed so that it is convex on the side shown in FIGS. 2, 4 and 6 and concave on the side illustrated in FIGS. 3 and 5. This facilitates the formation of folded edge 40 shown in FIG. 7.

Another preferred embodiment of the print medium 14 is shown in FIGS. 8 and 9. This embodiment designated 14a includes the same features as described above with regard to FIGS. 2–7, as noted by the use of like reference numerals followed by the letter "a"; however, the instructional indicia 36a contain further distinctive elements particularly relating to page layout.

Along the top and left portions of outer margin 30a, the indicia 36a include graphical measurement scales defined in suitable units (e.g., inches subdivided into eighths).

Also marked in these marginal areas are specific numerical measurements designating outer print margin dimensions and inner guidelines correlated to respective segments of perforations 26a. These explicitly designate layout parameters to facilitate use of the print medium 14a in applications with programs which are not predefined to the layout of the print medium 14a.

Indicia 36a further include textual instructions for use with the foregoing. This is contained in the bottom margin marked in FIG. 8 "[PAGE LAYOUT INSTRUCTIONS]." In actual implementation, the following is an example of specific instructional indicia printed in the bottom marginal area:

TO USE THIS CARD WITH PAGE LAYOUT SOFTWARE: Create an 8½×11 inch page in "landscape" orientation. Set the print margins as follows: Top and Bottom at 0.75 inch, Left and Right at 0.625 inch. Next, create a guideline 0.125 inch in from top, bottom, left and right print margins (these guidelines are where the perforations are on the card). Finally, create a guideline 5.5 inches in from the left edge for the center fold line. As you layout your card, place any images beyond the guidelines to create an edge-to-edge effect.

Along the right-hand portion (as viewed in FIG. 8) of the outer margin 30a are instructional indicia explaining how to remove the outer border. A similar instruction is given on the reverse side shown in FIG. 9. FIG. 9 also shows more limited instructional indicia in the top margin.

Another feature of the print medium 14a different from what is shown in FIGS. 2–5 is the extension of each of the segments of the perforated line 26a completely to the respective edges of the substrate. This allows each marginal strip to be separately removed.

A specific type of print medium is 8½-inches by 11-inches, grade no. 1, white 90 pound exact index Monotype custom card stock having perfect edge micro-perfs with fifty perforations per inch. This card stock also has a typical printer's score across its width located 5½ inches in from both of the edges that measure 8½ inches. Two perforation segments are located at ¾ inch inwardly from and parallel to the 8½-inch long edges, and the two intersecting perforation segments are located at ⅞ inch inwardly from and parallel to the edges measuring eleven inches. This creates a 6¾-inches×9½-inches flat printed output or a 4¾-inches× 6¾-inches folded printed output. This folded form fits in a standard 5¼-inches×7¼-inches envelope.

Memory Device 20

Figure 10:
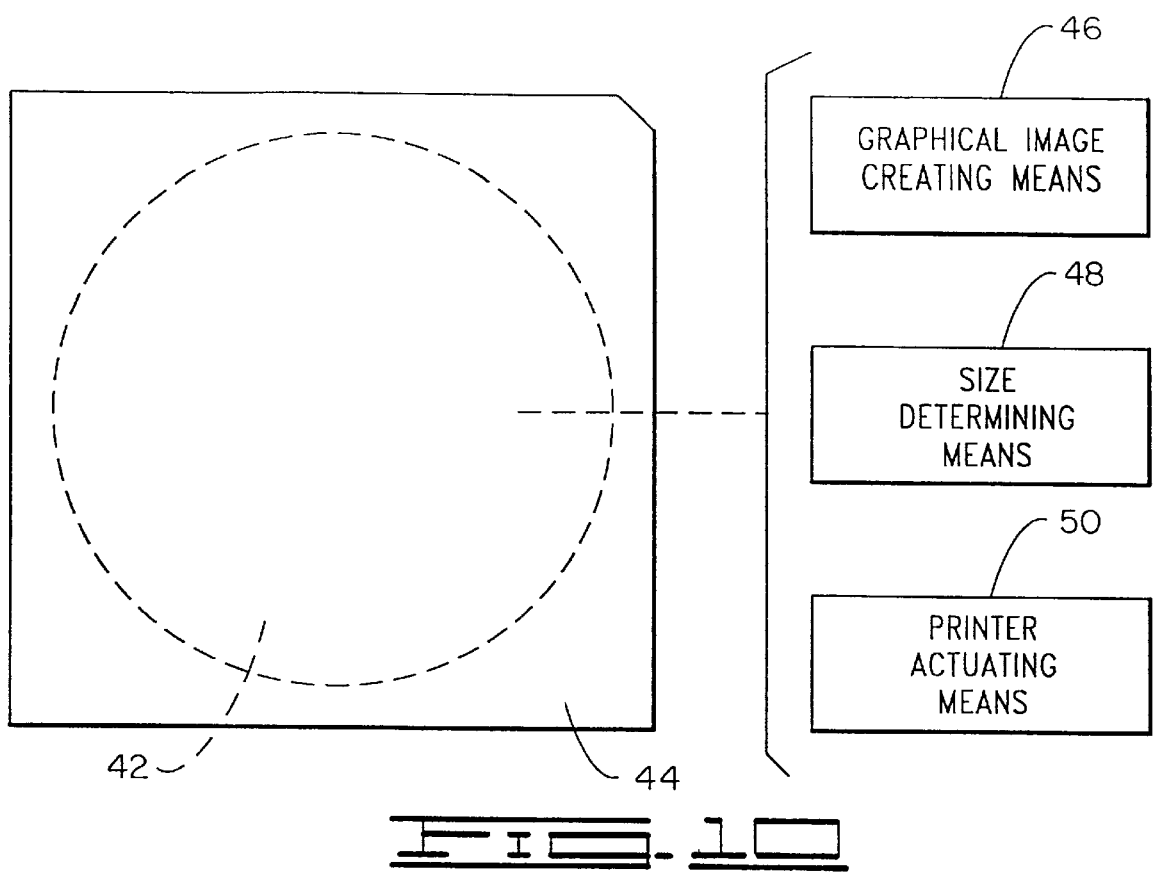
FIG. 10 is representation of a preferred embodiment of a memory device including graphical image creating means, size determining means and printer actuating means of the present invention.

The memory device 20 of the present invention is adapted to connect with the personal computer system 2 in any suitable manner as referred to above (e.g., as an internally installed hard drive, or an externally connectable memory such as a diskette or compact disc). Preferably, however, the memory device 20 comprises a memory substrate, a portable housing having the memory substrate disposed therein, and apparatus for printing a graphical image through the personal computer system 2. Referring to FIG. 10, the memory substrate is shown as a memory disk 42 (e.g., a floppy disk) rotatably disposed in a housing 44 to form a conventional 3½" diskette adapted to releasably connect to the personal computer system 2 (namely, a compatible disk drive thereof). The apparatus for printing a graphical image includes graphical image creating means 46, size determining means 48 and printer actuating means 50 encoded on the memory disk 42 in known manner.

The graphical image creating means 46 enables a user operating through the input 10 of the personal computer system 2 to select and modify what to print through the printer 12. That is, the graphical image creating means 46 enables the creation of graphical image, and text, to be printed onto one or both sides of the print medium 14 loaded in the printer 12. This can include a variety of colored background images and a selection of pre-written verses and it can also enable the making and utilization of customized images and text.

The graphical image creating means is appropriately encoded on the memory substrate 42 and adapted to communicate with the operating system program 22 to receive control information from user input into the personal computer system 2. The graphical image creating means 46 then creates with the personal computer system 2 a graphical image to be printed onto principally the primary printable area of the substrate 24 of the print medium 14 but also to some extent across the perforated line 26 and in the secondary print area as described above. The graphical image creating means can be used to create one or more images for printing on one or more sides of the print medium 14.

The size determining means 48 determines how big and where to print the graphical image that has been created. This can be predetermined if a particular size of print medium 14 is to be used; however, to allow versatility as to the size and shape of the print medium 14 accommodated, preferably the size determining means 48 is used to respond to control information from user input into the personal computer system to define at least one of (1) the overall size and shape of the print medium 14 or (2) the marginal area dimensions or (3) the primary printable area dimensions. The size determining means 48 is appropriately encoded on the memory substrate 42 and adapted to communicate with the operating system program 22.

The printer actuating means 50 adjusts what is to be printed to the appropriate size (i.e., bigger than the primary area but smaller than the area that would get into the "dead zone" for those portions of the graphical image to be printed to the edge of the finished product). The printer actuating means 50 also sequences what is to be printed on the front and back panel and on the inside panels of the preferred embodiments shown in FIGS. 2–9. The printer actuating means 50 also causes the user to be instructed to load the print medium 14 in a first appropriate position, and then the printer actuating means 50 causes the printer to be actuated to print as instructed. If both sides are to be printed, the printer actuating means 50 causes the user to be instructed to reinsert the print medium 14 back into the printer 12 in the next proper position to achieve the desired printing on the other side, and causes actuation of the printer to appropriately print. Thus, the printer actuating means 50 is appropriately encoded on the memory substrate 42 and adapted to operate in conjunction with the operating system program 22 to receive control information from user input into the personal computer system 2. In response to this, the printer actuating means 50 causes actuation of the printer to print the graphical image on the print medium such that at least part of the outer edge of the graphical image is printed continuously across at least part of the perforated line of the printable area of the print medium 14. Such actuation occurs at one time to print a first portion of the overall output on one side of the substrate 24 of the print medium 14 and at another time to print another portion of the overall output within at least the primary printable area on the other side of the substrate. Either side can be printed first in a given application. Whichever is printed first, the second printing step occurs after the substrate has first been output from the printer 12 after the first printing and then reloaded in changed orientation in the inlet of the printer 12.

FIGS. 11A–11I illustrate visual screens displayed through the display 8 in using graphical image creating means 46 and printer actuating means 50.

Figure 11A:
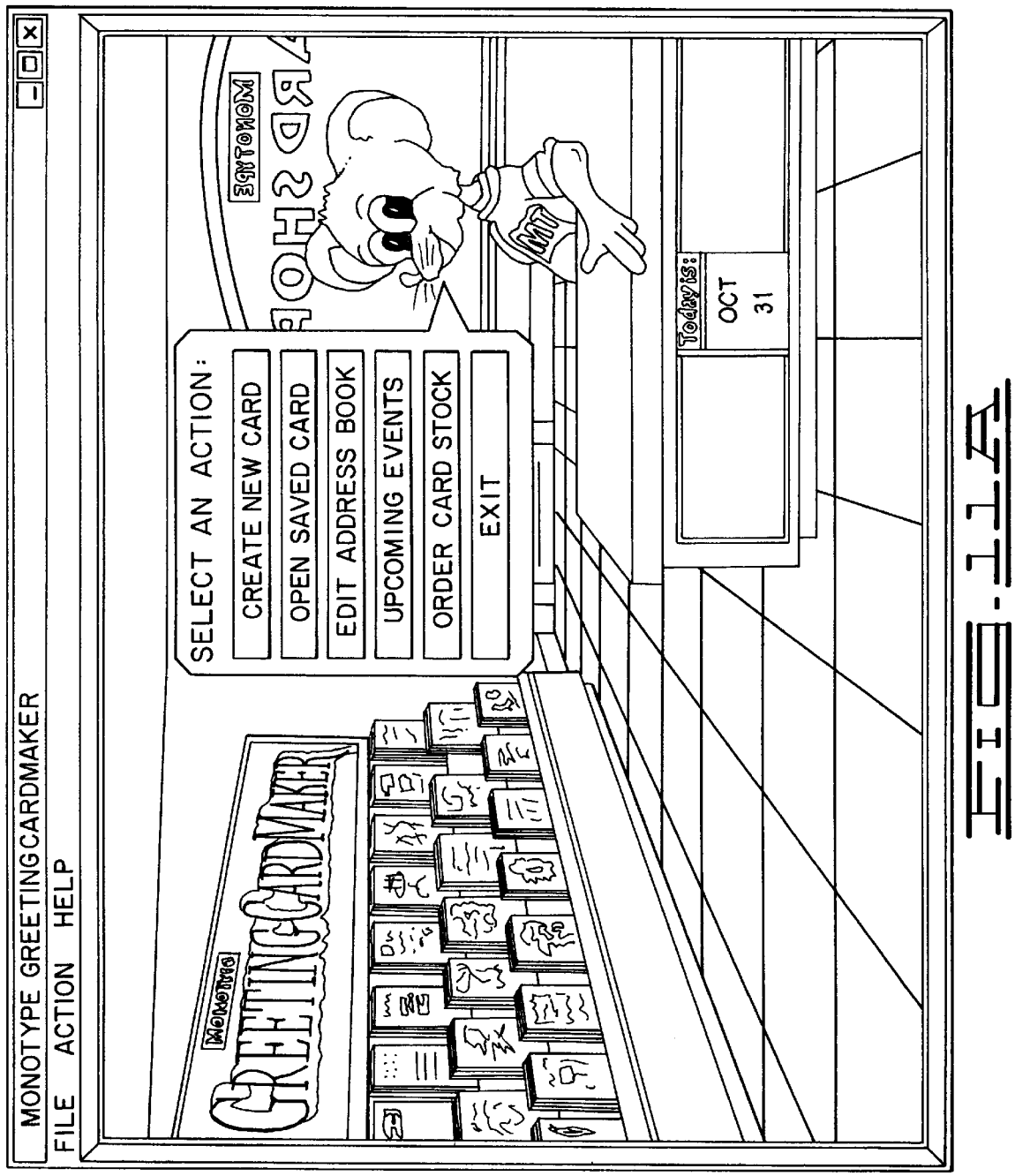

FIG. 11A shows a main menu screen presented through display 8. The main menu lists various options in an overall application program containing additional features beyond those particularly relevant to the presently claimed invention. Of relevance to the claimed invention is the selection entitled "Create New Card."

Figure 11B:
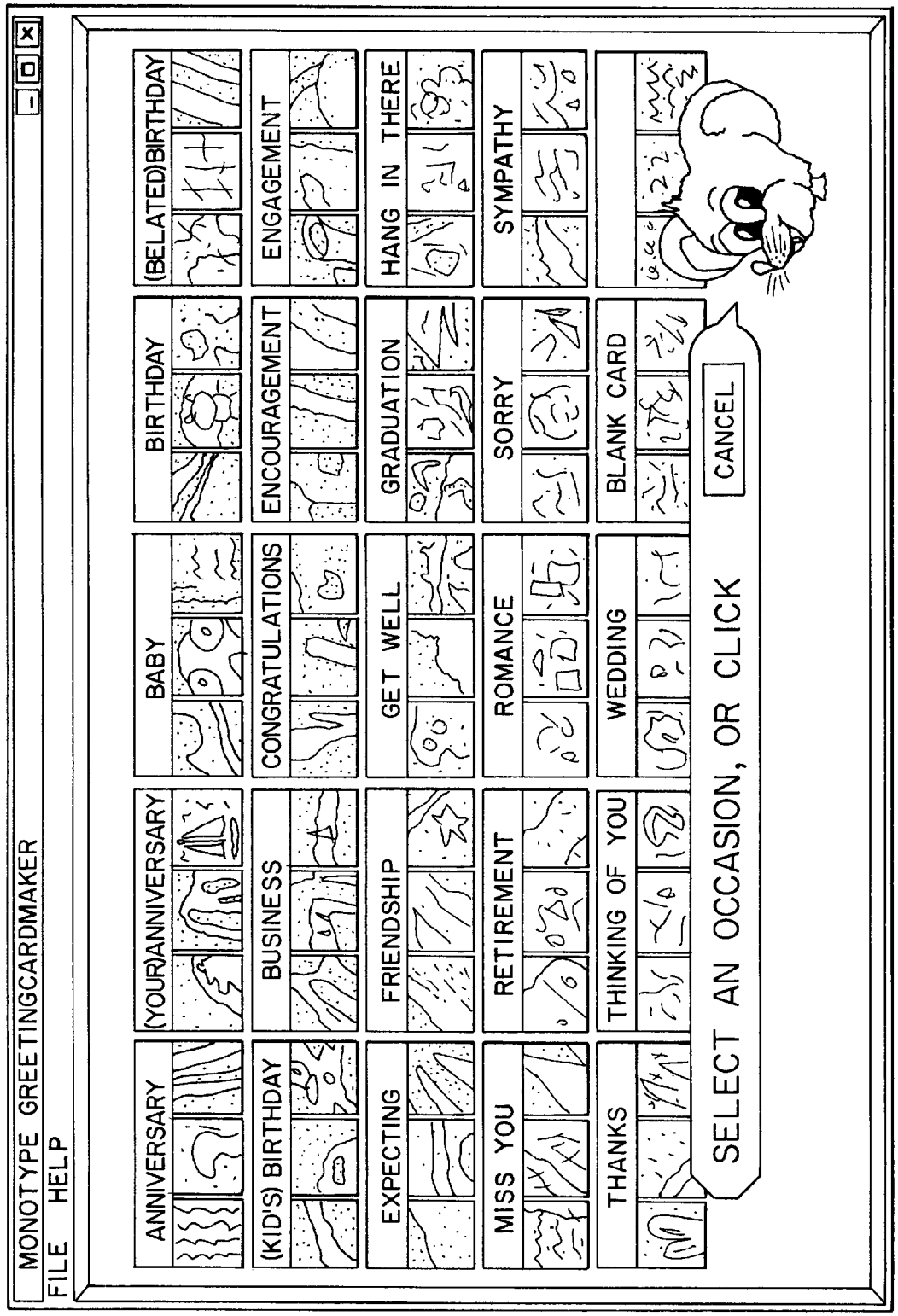

When "Create New Card" is selected via the screen of FIG. 11A, the screen shown in FIG. 11B appears on the display 8. This screen contains a number of "Occasion" categories. The user selects one or selects "Cancel."

Figure 11C:
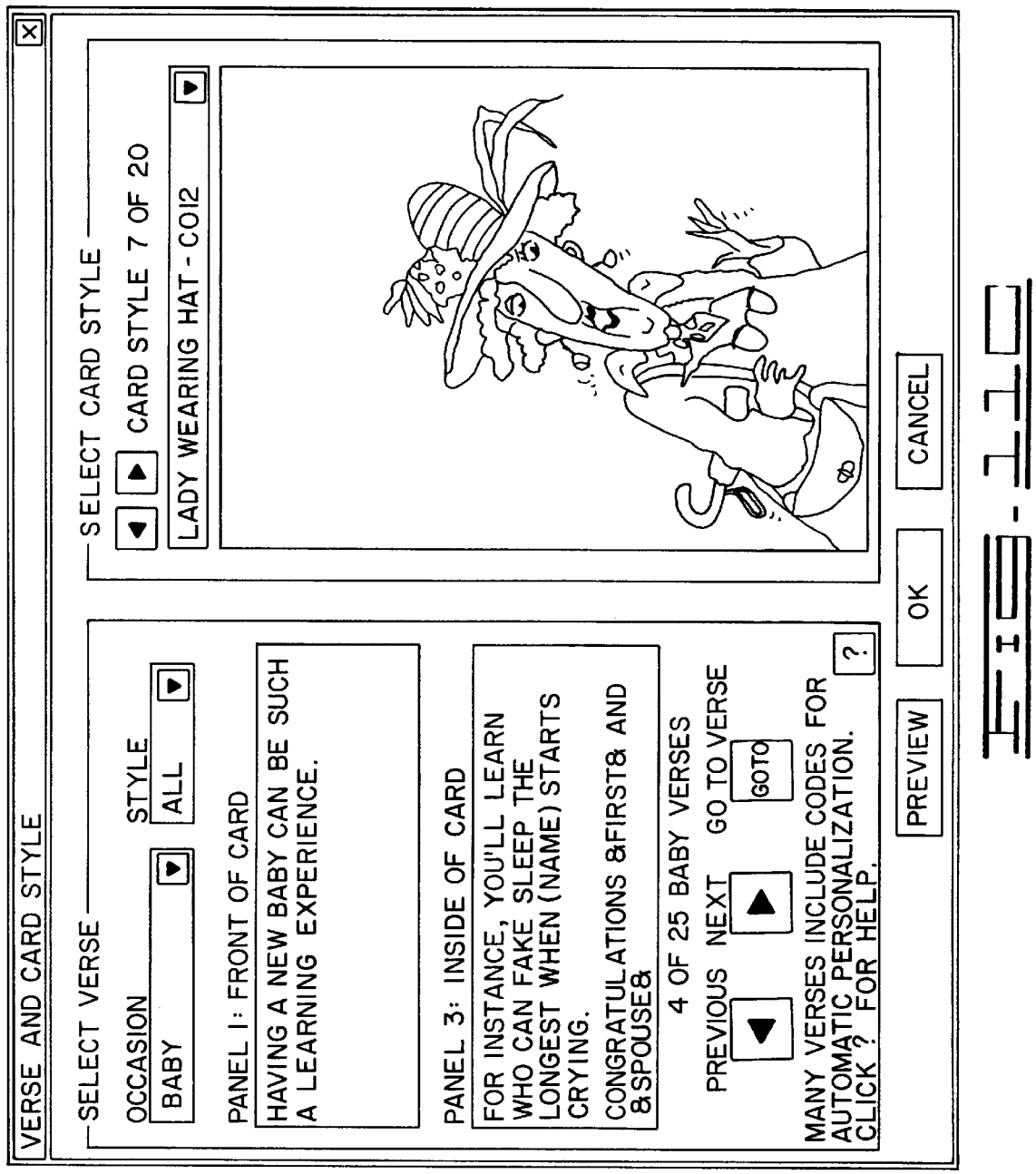

When an occasion category is selected, a screen such as that shown in FIG. 11C appears on the display 8. It is through this screen that the user selects specific graphical images and text predefined within the coding of the application program for the selected occasion (in this illustration, the "Baby" occasion). FIG. 11C shows one such graphical image and selected verses for panels 1 and 3. Once selections have been made, "OK" is selected.

From the screen shown in FIG. 1C, the screen shown in FIG. 11D is entered to allow editing. In this mode, the user can change any of the predetermined entries. Text and graphics can be added. Both sides of the print medium can be displayed in the edit mode so that any one or more of the four panels can be changed. Panels 1 and 4 are shown in FIG. 11D, and panels 2 and 3 are shown in FIG. 11E.

Figure 11E:
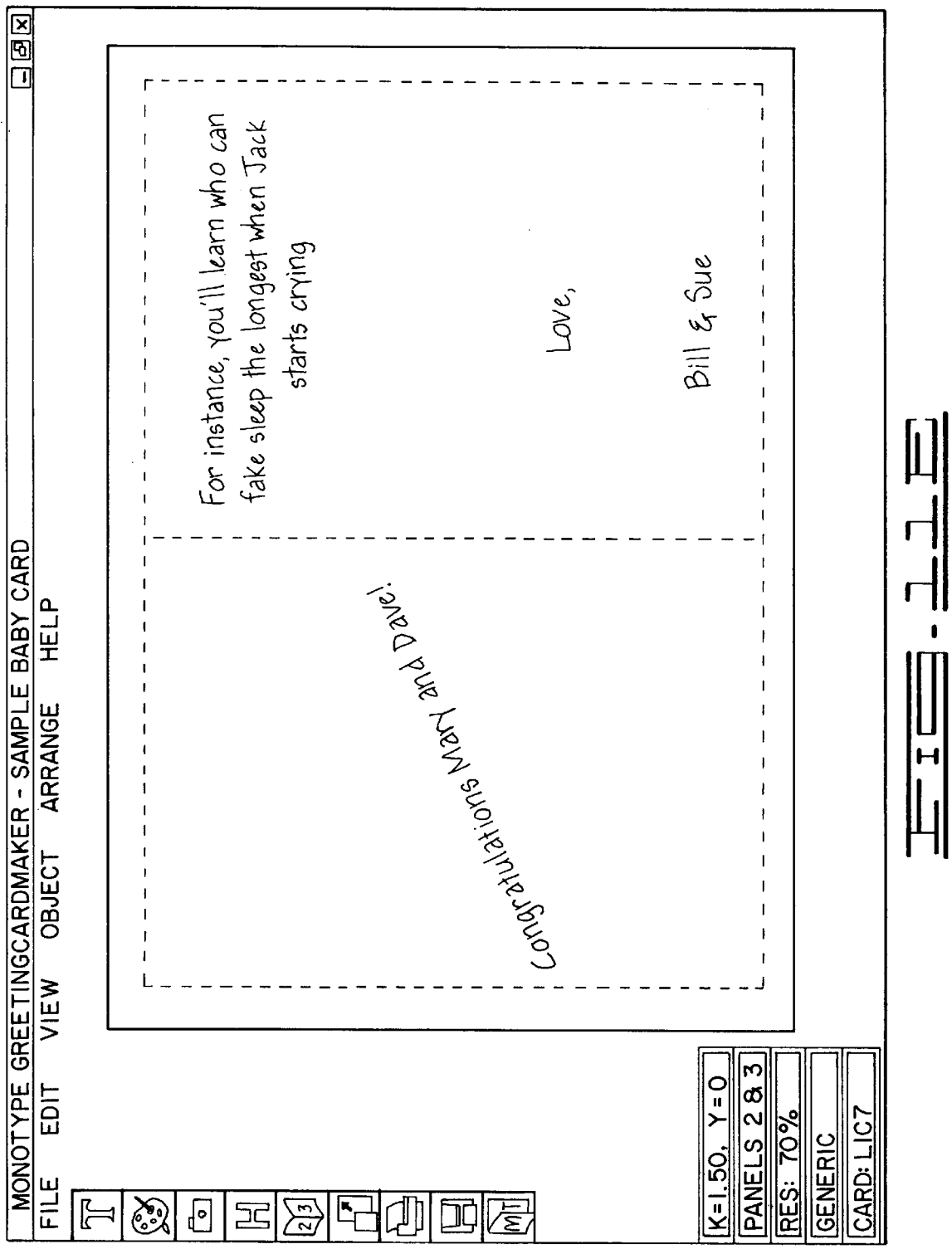

Once the graphical image and text to be used on the card are finalized, the printing mode is entered, such as by clicking on the printer tool bar button shown in FIGS. 11D and 11E.

Figure 11F:
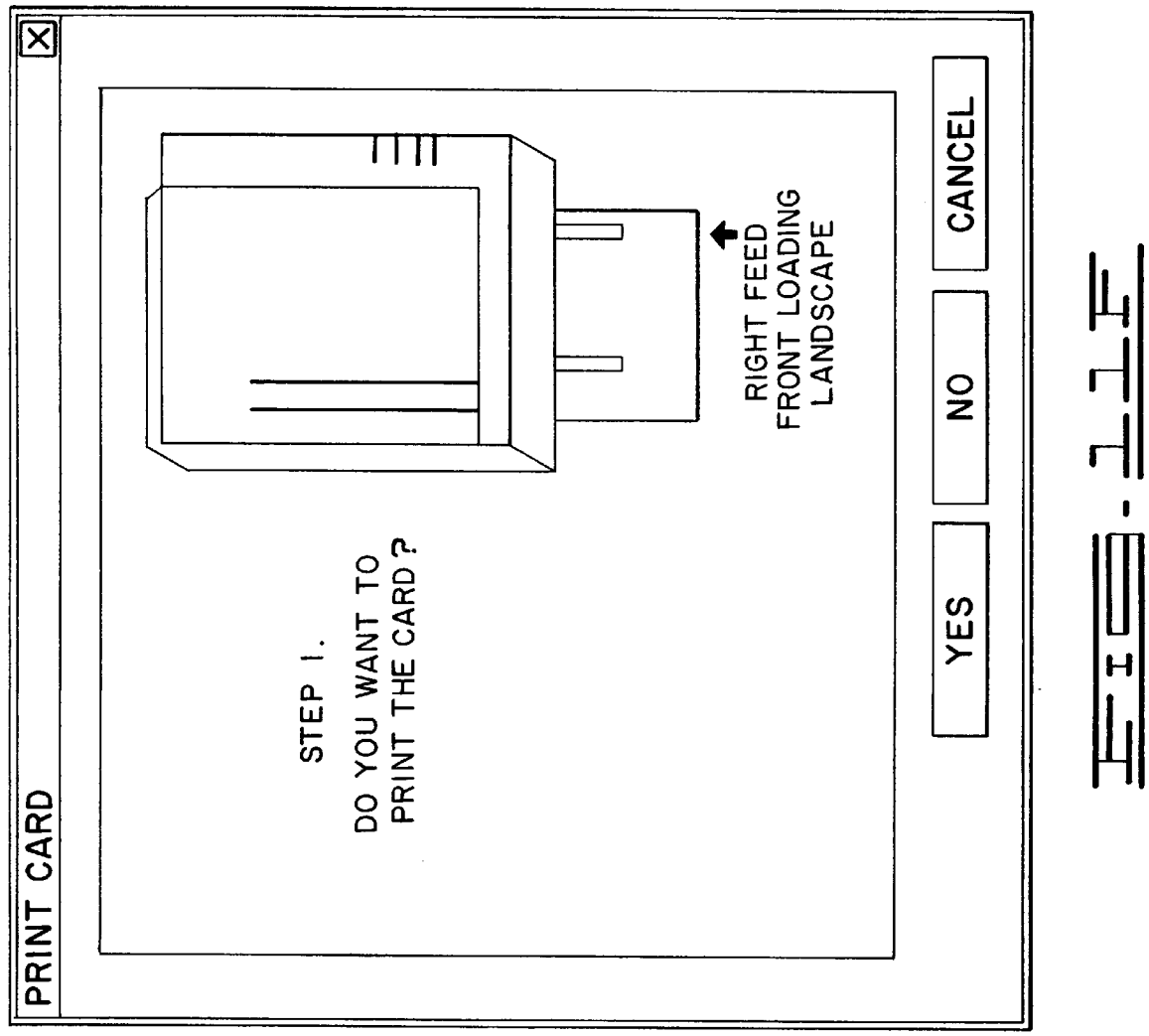

In the print mode, the screen shown in FIG. 11F first asks whether the user wants to print a card. If so, "yes" is selected. The screen shown in FIG. 11G then appears on the display 8 showing instructions on how to insert the print medium 14 in the proper manner for the specific printer used in the particular computer system. The side shown in FIG. 11G is printed (if desired), and then the screen shown in FIG. 11H is displayed to allow for printing the other side. Again, the screen shown through the display 8 instructs the user on how to insert the print medium 14. Finally, the screen shown in FIG. 11I is displayed to inquire whether an envelope is to be printed.

In working through the screens shown in FIGS. 11A-11I, the user enters commands in any suitable manner as is well known (e.g., via keyboard or mouse manipulation).

The application program and the means 46 and 50 thereof (i.e., the encoded instructions and data as embodied on a memory) generate the screens shown in FIGS. 11A–11I. The creation of specific program code for doing so can be readily implemented by one having ordinary skill in the art given the description of the present invention contained in this specification and the drawings hereof. A specific implementation of the image creating means 46 is the corresponding means of the application program contained in GreetingCardMaker™ from Monotype Typography, Inc., incorporated herein by reference. A specific implementation of the printer actuating means 50 is the corresponding means of the GreetingCardMaker™ program, which is also incorporated herein by reference, as modified to implement image sizing and positioning to overprint the perforations 26 and score line 38 to create an edge-to-edge image on panel 1 of a folded card of the type shown in FIG. 7. Such sizing and positioning are preferably transparent to the user as can be accommodated by using a standardized form of print medium 14 for which the application program is predefined. That is, for a given print medium having perforations 26 at a predefined location, the application program contains the instructions and data so that a selected graphical image is printed outwardly of the perforations but within the overall print margin. The overall print margin is outside the adjacent perforations but inside the printer's "dead zone." Thus, for the specific implementation of the 8½×11 print medium 14 referred to above having perforations ⅞ inch and ¾ inch inward of the respective edges, the printer actuating means 50 of the application program 18 includes these size parameters and instructions to print the selected graphical image larger than the resulting 6¾-inches by 4¾-inches portion of the primary printable area of panel 1 of the embodiments of FIGS. 2–9. For this implementation, it is specifically encoded to print up to a predefined maximum limited by the top and bottom print margin of ¾-inch and side margin of ⅝-inch.

The application program of the present invention can also be coded to allow for manual changes to be made by the user in the print layout. That is, one or more screens can be added to allow the user to define to the application program where the print margins are and where the perforations are to allow for use of other types or configurations of the print medium. This defines the size determining means 48.

Other modifications can be made to pre-existing software (e.g., enhanced graphics); however, such improvements or modifications are not specific to the present invention.

Thus, the means of the application program 18 are implemented by encoded instructions and data thereof which direct the computer system 2 to perform the foregoing functions. As mentioned, specific coding is contained in the GreetingCardMaker™ program incorporated herein by reference and as readily modified in accordance with the foregoing description.

Printed Card Manufacturing Kit

Figure 12:
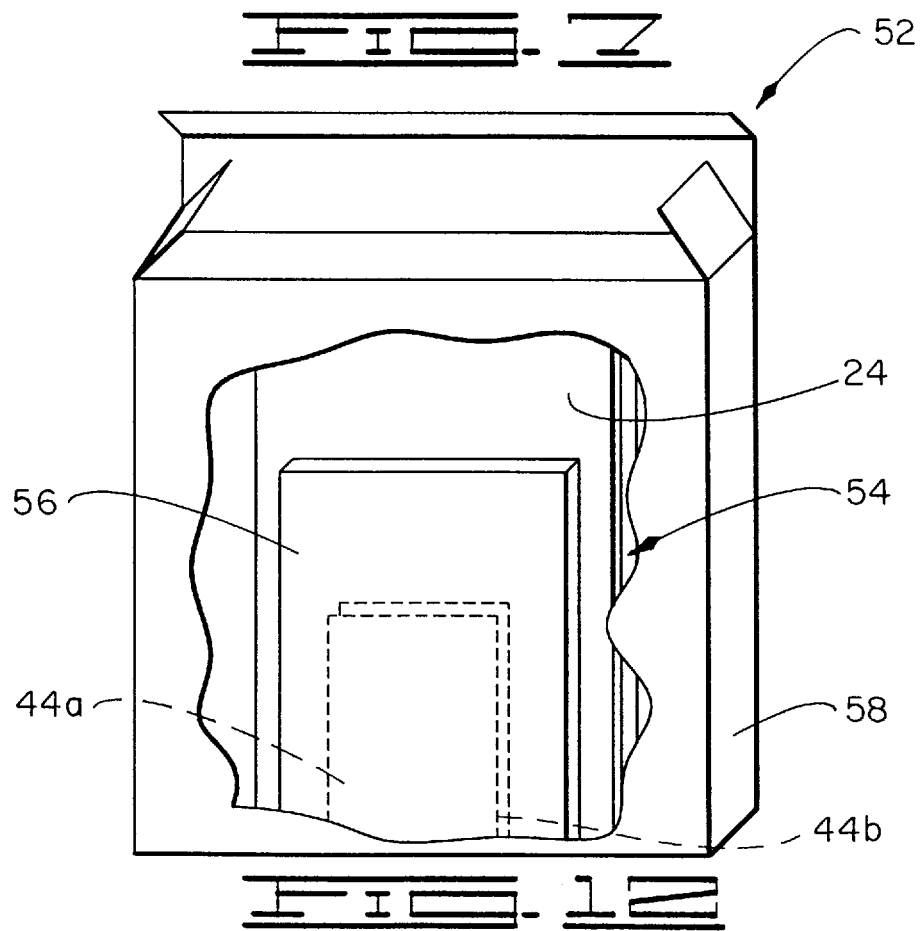
FIG. 12 is an elevational view, partially cut away, showing a preferred embodiment printed card manufacturing kit of the present invention.

The present invention also provides a printed card manufacturing kit capable of being installed in the personal computer system 2. That is, the printed card manufacturing kit provides the print medium 14 and the memory 20 having the application program 18 encoded thereon. A preferred embodiment of the kit is illustrated in FIG. 12 and generally identified by the reference numeral 52.

The kit 52 includes a plurality of the two-sided substrates 24. These preferably are packaged in a bundle 54 such as in a plastic wrapping as generally represented in FIG. 12.

Also included in the combination of the kit 52 is the memory device 20, such as one or more of the diskettes illustrated in FIG. 10. In a particular implementation, two such diskettes are included in the kit 52. These are shown in FIG. 12 as initially contained in a sealed envelope 56 preferably of the type containing what is referred to as a "shrink wrap" license.

The combination of the kit 52 still further comprises a package 58, such as a box containing the plurality 54 of substrates 24 and the component(s) of the memory device 20.

Method

The present invention also provides a method of making a finished printed output having graphical content printed to an edge of the finished printed output. This method comprises loading at least one of the two-sided print medium substrates 24 into a desktop printer, preferably an ink jet or laser printer, connected in the personal computer system 2. The print medium 14 is loaded so that one side of it is in a print position.

The method further comprises printing, with the desktop printer of the personal computer system 2, a graphical image on the first side of the print medium such that at least a portion of the graphical image is printed continuously across the perforated line 26 into both the outer margin 30 (specifically the secondary printable area thereof) and the primary printable area of the first side of the print medium. The result of this is illustrated in FIG. 4, for example.

This can be the end of the printing process. In such case, the method further comprises removing the print medium 14 from the printer 12 and removing the outer margin 30 by tearing along the perforated line 26 so that the remaining portion of the print medium 14 becomes the finished printed output having at least a portion of the graphical image extending completely to an edge of the finished printed output. This is illustrated in FIG. 6, for example. In the preferred embodiment, the print medium has the score line 38 so that the method can further comprise folding the remaining portion of the print medium 14 along this line after the outer margin 30 is removed so that the resulting finished printed output is the folded card such as illustrated in FIG. 7.

Before the step of removing the outer margin, the method of the present invention can further comprise reloading the print medium into the printer 12 in changed orientation from the first step of loading the print medium in the orientation referred to above, and thereafter printing on the other side of the print medium in proper orientation relative to the image printed on the first-printed side of the print medium 14. These steps of loading and reloading occur in the preferred embodiment in response, at least in part, to the instructional indicia 36 disposed in the outer margin 30 of both sides of the print medium 14.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. An improved personal computer system of the type including a central processing unit, a memory connected to the central processing unit, an operating system program stored in the memory, a display responsive to control by the central processing unit, input means for providing input to the personal computer system, and a printer responsive to control by the central processing unit, wherein the improvement comprises:

a two-sided substrate loaded in the printer and having an outer periphery and a continuous perforated line spaced inwardly of said outer periphery such that said perforated line defines corresponding primary printable areas on both sides of said substrate inwardly of said perforated line and such that said perforated line defines corresponding secondary printable areas on both sides of said substrate outwardly of said perforated line, wherein said substrate has instructional indicia disposed thereon outwardly of said perforated line, said instructional indicia for guiding input of instructions to the personal computer system and the loading of said substrate in the printer; and an application program loaded in the memory, wherein said application program is compatible with the operating system program and wherein said application program includes:

means, responsive to input from a user using the input means in accordance with said indicia, for providing an output having a first portion to be printed on one side of said substrate in said primary printable area thereof and having a second portion to be printed on the other side of said substrate in said primary printable area thereof;

means, responsive to input from the user using the input means in accordance with said indicia, for actuating the printer at a first time (a) to print one of (1) said first portion of said output on said one side of said substrate such that part of said first portion is printed continuously across at least part of said perforated line and in said secondary printable area of said one side and the remainder of said first portion is printed within said primary printable area of said one side and (2) said second portion of said output within at least said primary printable area of said other side of said substrate, and (b) to output said substrate from the printer: and means, responsive to input from the user using the input means in accordance with said indicia, for actuating the printer at a second time to print the other of (1) said first portion of said output on said one side of said substrate such that part of said first portion is printed continuously across at least part of said perforated line and in said secondary printable area of said one side and the remainder of said first portion is printed within said primary printable area of said one side and (2) said second portion of said output within at least said primary printable area of said other side of said substrate, after said substrate has been output from the printer and reloaded in changed orientation in the printer.

2. The improvement of claim 1, wherein said instructional indicia include page layout indicia.

3. The improvement of claim 2, wherein said page layout indicia include:
   a first measurement scale disposed near a first portion of said outer periphery of said substrate outwardly of said perforated line;
   a second measurement scale disposed near a second portion of said outer periphery of said substrate outwardly of said perforated line; and
   textual instructional indicia disposed near a third portion of said outer periphery of said substrate outwardly of said perforated line.

4. The improvement of claim 1, wherein said substrate includes an 8½-inches by 11-inches rectangular sheet of card stock having said perforated line defined at ¾ inch inwardly from the edges measuring 8½ inches and defined at ⅞ inch inwardly from the edges measuring 11 inches.

5. The improvement of claim 1, wherein said substrate further has a score line defined across at least said primary printable areas thereof.

6. A method of making a finished printed output having graphical content printed to an edge of the finished printed output, said method comprising:
   loading a two-sided print medium into a printer connected in a personal computer system, wherein the print medium is loaded so that a first side of the print medium is in a print position and further wherein the print medium has a perforated line defining outwardly therefrom a continuous outer margin along the entire periphery of the print medium and defining inwardly therefrom primary printable areas on both sides of the print medium, wherein the print medium is loaded by a user of the personal computer system into the printer during said loading step in response to the user having read instructional indicia disposed in the outer margin of the print medium;
   printing in response to the user operating the personal computer system, with the printer in the personal computer system, a graphical image on the first side of the print medium such that at least a portion of the graphical image is printed continuously across the perforated line into both the outer margin and the primary printable area of the first side of the print medium;
   removing by manual operation of the user the print medium from the printer; and
   removing by manual operation of the user the outer martin along the perforated line so that the remaining portion of the print medium becomes the finished printed output having at least a portion of the graphical image extending completely to an edge of the finished printed output.

7. A method as defined in claim 6, wherein:
   the print medium includes a predefined fold line across the primary printable areas distinct from the perforated line; and
   said method further comprises folding the remaining portion of the print medium along the fold line after the outer margin is removed so that the resulting finished printed output is a folded card.

8. A method as defined in claim 6, wherein:
   said method further comprises printing on the other side of the print medium; and
   one of said printing steps is performed before the other of said printing steps such that the later performed printing step is performed after loading the print medium into the printer in changed orientation from the orientation of the print medium loaded for the earlier performed printing step.

9. A method as defined in claim 8, wherein said step of loading the print medium into the printer in changed orientation includes loading the print medium by manual operation of the user in response to the user having read instructional indicia disposed in the outer margin of at least one side of the print medium.

10. A method as defined in claim 9, wherein:
    the print medium includes a predefined fold line across the primary printable areas distinct from the perforated line; and
    said method further comprises folding the remaining portion of the print medium along the fold line after the outer margin is removed so that the resulting finished printed output is a folded card.

11. A print medium for use in a personal computer system which includes a printer to produce a printed output having at least a portion of a graphical image printed completely to an edge of the printed output, said print medium comprising a two-sided substrate to load in the printer of the personal computer system, said substrate having an outer periphery and a continuous perforated line spaced inwardly of said outer periphery such that said perforated line defines a primary printable area on a side of said substrate inwardly of said perforated line and further such that said perforated line defines a marginal area having a secondary printable area on said side of said substrate outwardly of said perforated line, further comprising instructional indicia disposed on said marginal area, wherein said primary and secondary printable areas are located within said substrate to receive printing of the graphical image from the printer operated by the personal computer system in response to a user reading said instructional indicia and setting at least one of the personal computer system, the printer thereof, or said print medium in relation to the printer in response thereto, such that at least a portion of the graphical image is printed across the perforated line into at least part of both said primary and secondary printable areas.

12. A print medium as defined in claim 11, wherein said substrate further has a score line defined across at least said primary printable area so that the portion of said substrate remaining after tearing along the perforated line and removing said marginal area is folded along the score line to provide a folded card having at least a portion of the graphical image printed completely to a non-folded edge of the card.

13. A print medium as defined in claim 11, wherein said instructional indicia include page layout indicia.

14. A print medium as defined in claim 13, wherein said page layout indicia include:
    a first measurement scale disposed in a first portion of said marginal area of said substrate;
    a second measurement scale disposed in a second portion of said marginal area of said substrate; and textual instructional indicia disposed in a third portion of said marginal area of said substrate.

15. A print medium as defined in claim 11, wherein said instructional indicia include a graphical measurement scale disposed on said marginal area.

16. A print medium for use in a personal computer system which includes a printer to produce a printed output having at least a portion of a graphical image printed completely to an edge of the printed output, said print medium comprising a two-sided substrate to load in the printer of the personal computer system, said substrate having an outer periphery and a continuous perforated line spaced inwardly of said outer periphery such that said perforated line defines corresponding primary printable areas on both sides of said substrate inwardly of said perforated line and further such that said perforated line defines corresponding marginal areas having secondary printable areas on both sides of said substrate outwardly of said perforated line, further comprising instructional indicia disposed on at least one of said marginal areas, wherein said primary and secondary printable areas are located within said substrate to receive printing of the graphical image from the printer operated by the personal computer system in response to a user reading said instructional indicia and setting at least one of the personal computer system, the printer thereof, or said print medium in relation to the printer in response thereto, such that at least a portion of the graphical image is printed across the perforated line into at least part of both said primary and secondary printable areas of at least one side of said substrate.

17. A print medium as defined in claim 11, wherein said substrate includes an 8½-inches by 11-inches sheet of card stock having said perforated line defined at ¾ inch inwardly from the edges measuring 8½ inches and defined at ⅞ inch inwardly from the edges measuring 11 inches.

18. A print medium as defined in claim 16, wherein said instructional indicia comprise page layout indicia including:
   a first measurement scale disposed in a first portion of one of said marginal areas of said substrate;
   a second measurement scale disposed in a second portion of said one of said marginal areas of said substrate; and
   textual instructional indicia disposed in a third portion of said one of said marginal areas of said substrate.

19. A print medium as defined in claim 16, wherein said substrate further has a score line defined across at least said primary printable areas so that the portion of said substrate remaining after tearing along the perforated line and removing said marginal areas is folded along the score line to provide a folded card having at least a portion of the graphical image printed completely to a non-folded edge of the card.

20. A print medium as defined in claim 19, wherein said substrate includes an 8½-inches by 11-inches sheet of card stock having said perforated line defined at ¾ inch inwardly from the edges measuring 8½ inches and defined at ⅞ inch inwardly from the edges measuring 11 inches, and said sheet further having said score line defined across the width thereof at 5½ inches from the edges measuring 8½ inches.

21. A print medium as defined in claim 16, wherein said instructional indicia include a graphical measurement scale disposed on at least one of said marginal areas.

22. An improved personal computer system of the type including a central processing unit, a memory connected to the central processing unit, an operating system program stored in the memory, a display responsive to control by the central processing unit, input means for a user to provide input to the personal computer system, and a printer responsive to control by the central processing unit, wherein the improvement comprises:
   a two-sided substrate loaded in the printer, which substrate has at least one continuous, closed perforated line circumscribing a primary printable area defined thereby on said substrate inwardly of the perforated line such that the primary printable area has a regular or irregular shape as defined by the perforated line and such that the primary printable area is the area of a finished product of the personal computer system; the continuous, closed perforated line also defining the inner boundary of a secondary printable area disposed on said substrate outwardly from the perforated line, which secondary printable area surrounds the respective primary printable area to receive printing into any portion of the secondary printable area from the personal computer system but which secondary printable area does not form part of any such finished product of the personal computer system; and
   computer software loaded in the personal computer system, wherein said computer software is compatible with the operating system program and which computer software (i) allows a user of the personal computer system to define a printing area corresponding to the shape of the primary printable area on the substrate, (ii) selects an actual printing area larger in at least part than the primary printable area on the substrate, (iii) allows the user of the personal computer system to generate a graphical image from at least one of graphic material stored within the computer software, graphic material stored within the memory of the computer, or graphic material created by the user of the personal computer system, and (iv) transmits data defining such graphical image to the printer such that the printer prints such graphical image primarily upon the primary printable area of the substrate but also over the perforated line and onto the secondary printable area of the substrate.

23. A method of making a finished printed output having graphical content printed to an edge of the finished printed output, said method comprising:
   loading, by manual operation of a user of a personal computer system, a two-sided print medium into a conventional desktop printer connected in the personal computer system, wherein the printer is selected from the group consisting of ink jet printers, laser printers, bubble jet printers, solid ink printers, and thermal ink printers, and wherein the print medium is loaded so that a first side of the print medium is in a print position, and further wherein the print medium has at least one continuous, closed perforated line circumscribing a primary printable area defined thereby on the print medium inwardly of the perforated line such that the primary printable area has a regular or irregular shape as defined by the perforated line and such that the primary printable area is the area of a finished product of the personal computer system; the continuous, closed perforated line also defining the inner boundary of a secondary printable area disposed on the print medium outwardly from the perforated line, which secondary printable area surrounds the respective primary printable area to receive printing into any portion of the secondary printable area from the personal computer system but which secondary printable area does not form part of any such finished product of the personal computer system;
   defining in the personal computer system in response to input from the user a printing area corresponding to the shape of the primary printable area;

automatically selecting by operation of the personal computer system an actual printing area larger in at least part than the primary printable area;

generating a user selected graphical image for printing in the primary printable area;

printing, with the printer in the personal computer system, the graphical image on the first side of the print medium such that at least a portion of the graphical image is printed continuously across the perforated line into both the secondary printable area and the primary printable area of the first side of the print medium;

removing, by manual operation of the user, the print medium from the printer; and removing by manual operation of the user, the outer margin along the perforated line so that the remaining portion of the print medium becomes the finished printed output having at least a portion of the graphical image extending completely to an edge of the finished printed output.

24. A method as defined in claim 23, wherein:

said method further comprises printing on the other side of the print medium; and one of said printing steps is performed before the other of said printing steps such that the later performed printing step is performed after loading the print medium into the printer in changed orientation from the orientation of the print medium loaded for the earlier performed printing step.

* * * * *

UNITED STATES PATENT AND TRADEMARK OFFICE
CERTIFICATE OF CORRECTION

Patent No.: 5,825,996

Dated: October 20, 1998

Inventor(s): William N. Davis and Ira Mirochnick

It is certified that errors appear in the above-identified patent and that said Letters Patent is hereby corrected as shown below:

Column 2, line 21, insert --a-- between "in" and "different".

Column 9, line 66, change "1C" to --11C--.

Column 13, line 57, change "martin" to --margin--.

Signed and Sealed this

Twelfth Day of January, 1999

Attest:

Attesting Officer

*Acting Commissioner of Patents and Trademarks*